(12) United States Patent
Zingsheim et al.

(10) Patent No.: US 12,517,483 B2
(45) Date of Patent: Jan. 6, 2026

(54) FIELD DEVICE WITH LATCHING RELAY

(71) Applicant: Rosemount Inc., Shakopee, MN (US)

(72) Inventors: Justin Tai Zingsheim, Minneapolis, MN (US); Nicholas Aaron Wienhold, Waconia, MN (US)

(73) Assignee: ROSEMOUNT INC., Shakopee, MN (US)

( * ) Notice: Subject to any disclaimer, the term of this patent is extended or adjusted under 35 U.S.C. 154(b) by 414 days.

(21) Appl. No.: 18/339,522

(22) Filed: Jun. 22, 2023

(65) Prior Publication Data

US 2024/0427301 A1    Dec. 26, 2024

(51) Int. Cl.
*G05B 19/042*    (2006.01)
*G05B 15/02*    (2006.01)

(52) U.S. Cl.
CPC ......... *G05B 19/0423* (2013.01); *G05B 15/02* (2013.01); *G05B 2219/25428* (2013.01)

(58) Field of Classification Search
None
See application file for complete search history.

(56) References Cited

U.S. PATENT DOCUMENTS

| | | |
|---|---|---|
| 3,693,163 A | 9/1972 | Johnson et al. |
| 3,936,755 A | 2/1976 | Sheng |
| 4,084,155 A | 4/1978 | Herzl et al. |

(Continued)

FOREIGN PATENT DOCUMENTS

JP    2005-221773 A    8/2005

OTHER PUBLICATIONS

International Search Report for corresponding International Patent Application No. PCT/US2024/024939, dated Sep. 13, 2024, filed Apr. 17, 2024, 5 pages.

(Continued)

*Primary Examiner* — Mohammad Ali
*Assistant Examiner* — Saad M Kabir
(74) *Attorney, Agent, or Firm* — Westman, Champlin & Koehler

(57) ABSTRACT

A field device for an industrial process includes a digital isolator which electrically divides the field device into a primary side for low voltage electronics from a secondary side. A device power supply located in the secondary side is configured to provide power to a process control device which monitors or controls a process variable of the industrial process. A latching relay located in the secondary side couples to the process control device and the device power supply and has a set input to responsively couple the device power supply to the process control device and a reset input which causes the latching relay to enter an electrically open state to thereby disconnect the device power supply from the process control device. A controller located in the primary side is configured to generate a switch signal. The digital isolator extends between the primary side and the secondary side and couples to the switch signal from the controller and provides a digital output on the secondary side in response to the switch signal. Edge triggered circuitry couples to the digital output of the digital isolator and provides a pulse output to the reset input of the latching relay in response the digital output of the digital isolator.

15 Claims, 5 Drawing Sheets

(56) References Cited

U.S. PATENT DOCUMENTS

| | | | |
|---|---|---|---|
| 5,318,164 A * | 6/1994 | Barnes | G07F 1/045 |
| | | | 194/348 |
| 5,327,068 A | 7/1994 | Lendrum et al. | |
| 5,432,386 A | 7/1995 | Cerra, Jr. et al. | |
| 5,436,788 A | 7/1995 | Wallaert | |
| 5,438,311 A | 8/1995 | Lane, Sr. | |
| 5,993,039 A | 11/1999 | Crill | |
| 6,246,562 B1 | 6/2001 | Durif | |
| 6,355,913 B1 | 3/2002 | Authier et al. | |
| 7,498,974 B2 | 3/2009 | Nilsson | |
| 9,698,672 B2 | 7/2017 | Chung et al. | |
| 10,177,646 B2 | 1/2019 | Chung et al. | |
| 10,915,084 B2 | 2/2021 | Wienhold et al. | |
| 11,004,637 B2 | 5/2021 | Wienhold et al. | |
| 11,630,430 B2 * | 4/2023 | Hou | G05B 19/0423 |
| | | | 700/28 |
| 2004/0263183 A1 | 12/2004 | Naidu et al. | |
| 2006/0148410 A1 | 7/2006 | Nelson et al. | |
| 2006/0290328 A1 | 12/2006 | Orth | |
| 2008/0280568 A1 | 11/2008 | Kielb et al. | |
| 2009/0309558 A1 | 12/2009 | Kielb | |
| 2009/0311971 A1 | 12/2009 | Kielb et al. | |
| 2010/0270982 A1 | 10/2010 | Hausman, Jr. et al. | |
| 2011/0282467 A1 | 11/2011 | Schulte | |
| 2013/0009483 A1 | 1/2013 | Kawate et al. | |
| 2016/0109871 A1 | 4/2016 | Phillips | |
| 2017/0288662 A1 | 10/2017 | Djelassi et al. | |
| 2018/0024195 A1 | 1/2018 | Takamura et al. | |
| 2018/0375363 A1 | 12/2018 | Wienhold et al. | |
| 2019/0066938 A1 | 2/2019 | Ishida et al. | |
| 2019/0097416 A1 | 3/2019 | Schmalz et al. | |
| 2019/0278244 A1 | 9/2019 | Wienhold et al. | |

OTHER PUBLICATIONS

Written Opinion for corresponding International Patent Application No. PCT/US2024/024939, dated Sep. 13, 2024, filed Apr. 17, 2024, 8 pages.

Communication from European Patent Application No. 19707172.3, dated Sep. 24, 2020.

Notification of Transmittal of the International Search Report and the Written Opinion of the International Searching Authority, or the Declaration from International Application No. PCT/US2019/016486, dated May 9, 2019.

Product Data Sheet, Rosemount 2120 Level Switch-Vibrating Fork, 00813-0100-04030, Rev. HC, Dec. 2017, 24 pgs.

Notice of Allowance and Fee(s) Due and Examiner Initiated Interview Summary for U.S. Appl. No. 15/928,449, mailed Jan. 26, 2021, 14 pages.

Non-Final Rejection for U.S. Appl. No. 15/928,449, mailed Sep. 3, 2020, 12 pages.

U.S. Appl. No. 15/918,226, filed Mar. 12, 2018.

* cited by examiner

FIELD DEVICE WITH LATCHING RELAY

BACKGROUND

Embodiments of the present disclosure relate to industrial process control systems for industrial plants. More specifically, embodiments of the present disclosure relate to an industrial process field device having a reset circuit for resetting a latching relay of the field device.

In industrial settings, control systems are used to monitor and control inventories of industrial and chemical processes, and the like. Typically, the control system performs these functions using industrial process field devices distributed at key locations in the industrial process and coupled to the control circuitry in the control system by a process control loop. The term "field device" refers to any device that performs a function in a distributed control or process monitoring system of industrial processes.

Typical field devices include device circuitry that enables the field device to perform conventional field device tasks such as process parameter monitoring and measurements using one or more sensors, and/or process control operations using one or more control devices. Exemplary sensors include pressure sensors, level sensors, temperature sensors, and other sensors used in industrial processes. Exemplary control devices include actuators, solenoids, valves, and other control devices.

The device circuitry of field devices may also include a controller that is used to control the sensors and/or control devices, and communicate with a process control system or other circuitry, over a process control loop, such as a 4-20 mA process control loop, for example. In some installations, the process control loop is used to deliver a regulated current and/or voltage to the field device for powering the field device. The process control loop can also carry data, such as a process parameter value corresponding to a sensed process parameter or a control set point or command. This data may be communicated over the process control loop as an analog signal, or as a digital signal.

Some field devices may include a switch, such as a latching relay, that is configured to connect or disconnect electrical power from an external power supply to an external device, such as a pump. The use of a latching relay conserves critical power used by the field device, but prevents the latching relay from returning to a reset condition in response to a power loss. Unfortunately, this could leave the external device in an undesired activated state, which could potentially cause damage in the industrial plant. In some implementations, an isolation barrier is provided to isolate sensitive electronics or provide a barrier between sections of electronic circuitry for safety or other purposes. When such an isolator is used, it is necessary to provide a means of transmitting an electrical signal to the latching relay across the isolation barrier. Related techniques are shown and described in U.S. Pat. No. 10,915,084, entitled FIELD DEVICE SWITCH MONITOR, assigned to Rosemount Inc. and U.S. Pat. No. 11,004,637, entitled FIELD DEVICE LATCHING RELAY RESET, assigned to Rosemount Inc.

SUMMARY

A field device for an industrial process includes a digital isolator which electrically divides the field device into a primary side for low voltage electronics from a secondary side. A device power supply located in the secondary side is configured to provide power to a process control device which monitors or controls a process variable of the industrial process. A latching relay located in the secondary side couples to the process control device and the device power supply and has a set input to responsively couple the device power supply to the process control device and a reset input which causes the latching relay to enter an electrically open state to thereby disconnect the device power supply from the process control device. A controller located in the primary side is configured to generate a switch signal. The digital isolator extends between the primary side and the secondary side and couples to the switch signal from the controller and provides a digital output on the secondary side in response to the switch signal. Edge triggered circuitry couples to the digital output of the digital isolator and provides a pulse output to the reset input of the latching relay in response the digital output of the digital isolator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
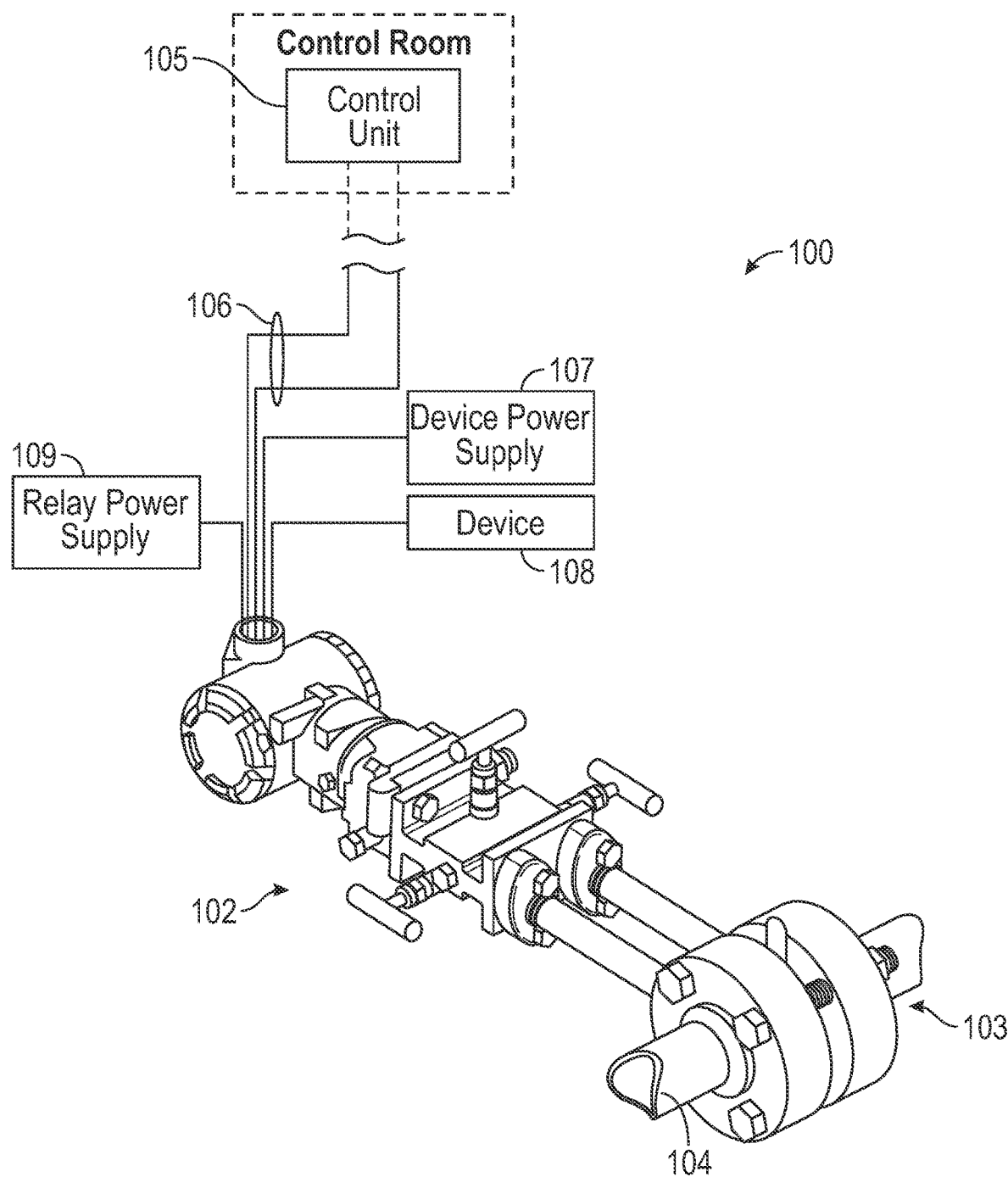
FIG. 1 is a diagram showing an example of a field device including a latching relay in accordance with one embodiment of the present invention.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

In many applications of industrial process field devices, an isolation barrier is implemented to separate sensitive low voltage electronics or provide safety insulation between sections of electronic circuitry. In these designs, it is often complicated to implement intelligent circuit control across the isolation barrier as it requires numerous digital communication lines. This invention provides a mechanism to generate a specific duration pulse across an isolation barrier by triggering an edge change on a single channel digital isolator or optocoupler. This enables discrete circuitry to provide a specific pulse across isolation without the need for signaling from a microcontroller.

In some implementations, a latching relay is located on a primary or high voltage side of the isolation barrier. In the case of the resetting of a latching relay, the invention can be utilized to generate a reset pulse for a latching relay across a high voltage isolation barrier. The reset pulse is triggered by a digital edge transition on the low voltage (primary) electronics side. This is used to reset the latching relay to a known state in the case of power loss on the primary side. The reset signal is generated automatically without the need for monitoring or interaction from a controller.

In certain applications, there may be the need for isolation of sections of electronic circuitry. This may be for reasons such as rejection of high common-mode voltages, safety from hazardous voltages, protection of circuitry from transient noise or eliminating potential ground loops. In these applications, there may be a need to control and provide for interaction between various sections of circuit elements across the isolation barrier. A challenge with such control and interaction is the additional requirements for software and the number of digital signals that may be used. These additional requirements can add cost, complexity and require additional board space to achieve even simple control functionality while maintaining the isolation.

This invention achieves a cost-effective and easily implemented solution using discrete components to provide a specifically timed digital pulse across an isolation barrier triggered by a digital edge change. In some applications, a microcontroller may not be capable of generating a specifically timed pulse through a digital isolator. This could be due to the primary side losing power or not having the available pins or signal paths across the isolation barrier to generate the needed pulse. Additionally, using a microcontroller implementation requires additional software functionality to appropriately generate the pulse from the digital input. This adds complexity to the software design that may be undesirable. This invention provides an implementation in which a digital signal can directly generate the pulse without the need for intervention of a microcontroller or more complex circuitry.

Embodiments of the present disclosure are generally directed to industrial process field devices, industrial process control systems that include the field device, and methods of controlling an external device using the field device. FIG. 1 is a simplified diagram of exemplary industrial process measurement or control system 100, in accordance with embodiments of the present disclosure.

The system 100 includes an industrial process field device 102 that may interact with an industrial process 103. In some embodiments, the process 103 involves a material, such as a fluid, transported though pipes, such as pipe 104, and/or contained in tanks, for example, that is processed by the system 100. This processing of the material generally transforms the material from a less valuable state into more valuable and useful products, such as petroleum, chemicals, paper, food, etc. For example, an oil refinery performs industrial processes that can process crude oil into gasoline, fuel oil, and other petrochemicals.

The field device 102 may communicate with a computerized control unit 105, which may be configured to control the field device 102. The control unit 105 may be remotely located from the field device, such as in a control room for the system 100, as shown in FIG. 1. The field device 102 may be connected to the control unit 105 over a two-wire process control loop 106, such as a 4-20 milliamp process control loop. In addition to communicating data over the control loop 106, such as by controlling the current through the control loop, the control loop 106 may fully power the field device 102. Another example configuration the process control loop 106 is a wireless process control loop operated in accordance with known techniques.

The field device 102 may be configured to switch power from a device power supply 107 to a control device 108, which are external to the field device 102. Embodiments of the control device 108 include, for example, a pump, a compressor, a solenoid, or another device that may be suitable for use with the system 100.

As discussed below, a latching relay is used to perform this switching function in the field device 102. The latching relay may be powered by a relay power supply 109, which is external to the field device 102. A controller (or microcontroller) of the field device 102, which may be electrically isolated from the relay power supply 109, generates signals that are used to direct the latching relay into its set state, in which power from the supply 107 is connected to the device 108, and its reset state, in which power from the supply 107 is disconnected from the device 108.

The latching relay maintains its set state (e.g., closed switch) or reset state (e.g., open switch) after a power loss to the relay supply, while a non-latching relay reverts to its reset state in response to a power loss. The latching relay is selected over the non-latching relay because the latching relay generally requires lower power to operate, which allows the field device 102 to meet critical low-power requirements while providing the desired switching function between the device power supply 107 and the device 108.

Figure 2:
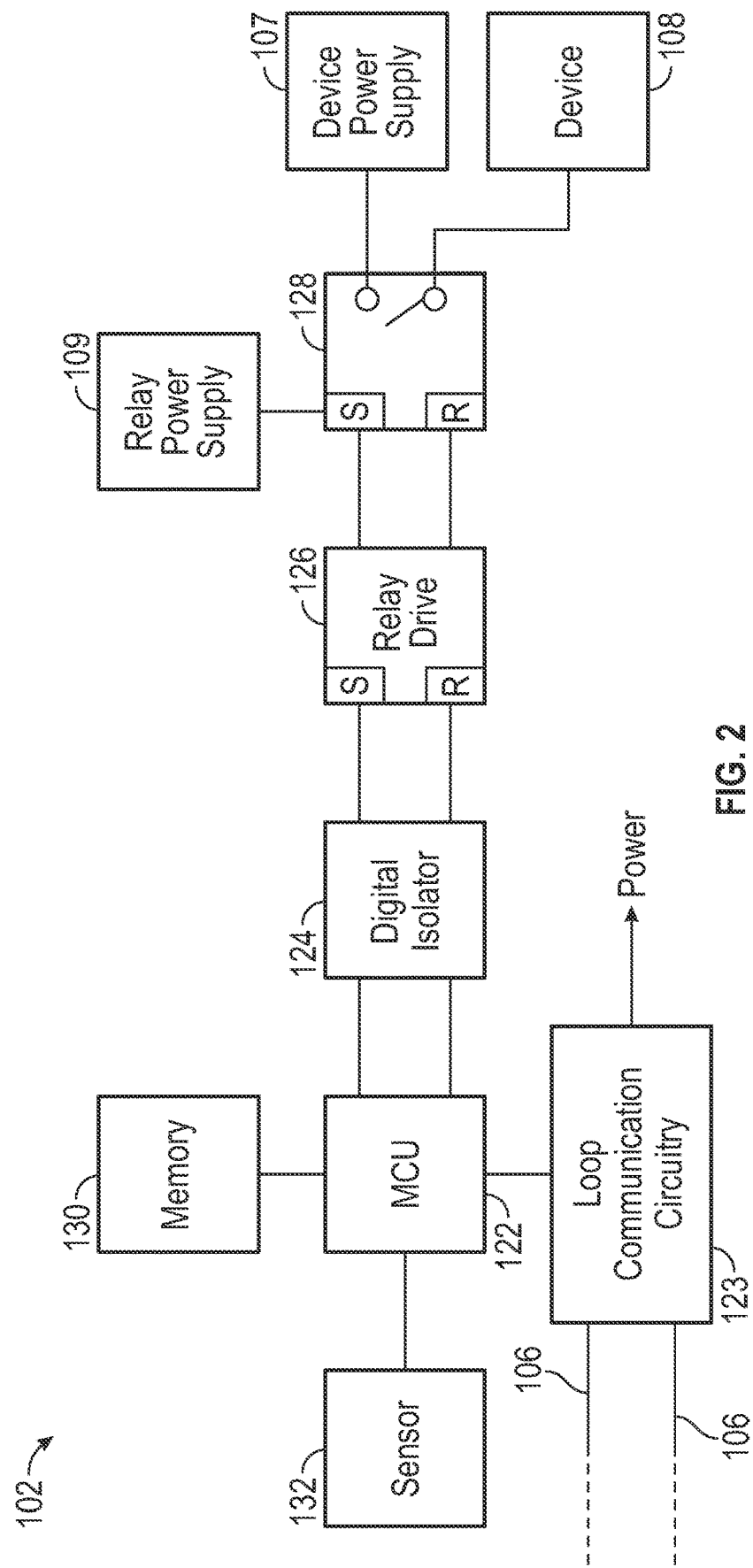
FIG. 2 is a block diagram showing a digital isolator and relay drive circuitry for a latching relay of the field device of FIG. 1.

FIG. 2 is a simplified block diagram showing one implementation of the invention. In FIG. 2, a microcontroller (MCU) 122 provides a set ("S") or reset ("R") signal to relay drive circuit 126 through a digital isolator 124. Relay drive circuit 126 provides a set or reset signal to latching relay 128 which causes the relay to enter a latched or "set" (for example, closed) state or a reset (for example, open) state. As shown in FIG. 2, relay 128 is used to couple device power supply 107 to control device 108. Microcontroller 122 operates in accordance with instructions stored in a memory 130. An optional sensor 132 is shown which can be used to sense a process variable of the industrial process such as pressure, level, or flow, for example. FIG. 2 also illustrates loop communication circuitry 123 which couples to two-wire process control loop 106. The loop communication circuitry 123 allows communication with the microcontroller 122 over process control loop 106. For example, a 4-20 milliamp current signal can be provided on loop 106. Information can be provided by controlling the current level and/or modulating a digital signal on the loop current carried by process control loop 106. This allows microcontroller 122 to receive a command, for example, which causes the latching relay 128 to be set. Further, loop communication circuitry 123 can include a power output which provides power to circuitry of field device 102. This power can be generated using power received from the process control loop 106 whereby power is provided to the MCU 122 and other circuitry of field device 102. As discussed herein in some configurations it is desirable for latching relay 128 to be reset upon loss of power from process control loop 106.

As discussed, the latching relay 128 will remain in its current state even after loss of power. A voltage pulse of a specified duration (i.e., 20 mS) must be applied to the appropriate coil of the relay 128 to reset or set the relay 128. The relay 128 is electrically isolated from the loop powered electronics by isolator 124 to keep high voltages separated from the loop powered (4/20 mA) electronics. The digital isolator 124 is used by the loop powered microcontroller 122 to control the relay 128 across the isolation barrier.

However, most installations in industrial processes are designed with the expectation that the relay 128 exhibits non-latching behavior. In a specific example, when power is lost, there is an expectation that the relay 128 will enter the reset (open) state. However, in the configuration shown in FIG. 2, if loop power to microcontroller 122 is lost, there will be no control over the relay 128 as the microcontroller 122 will be unpowered. Without loop power, there is no way to know what state the relay 128 is in, and also a lack of any way to control relay 128. To prevent this operating condition, the latching coil of the relay 128 must be reset by an applied voltage pulse, rather than a constantly applied voltage. The configuration set forth herein utilizes discrete components without additional software or microcontroller interaction to provide an appropriate timed voltage pulse to the reset coil upon loss of loop power.

Figure 3:
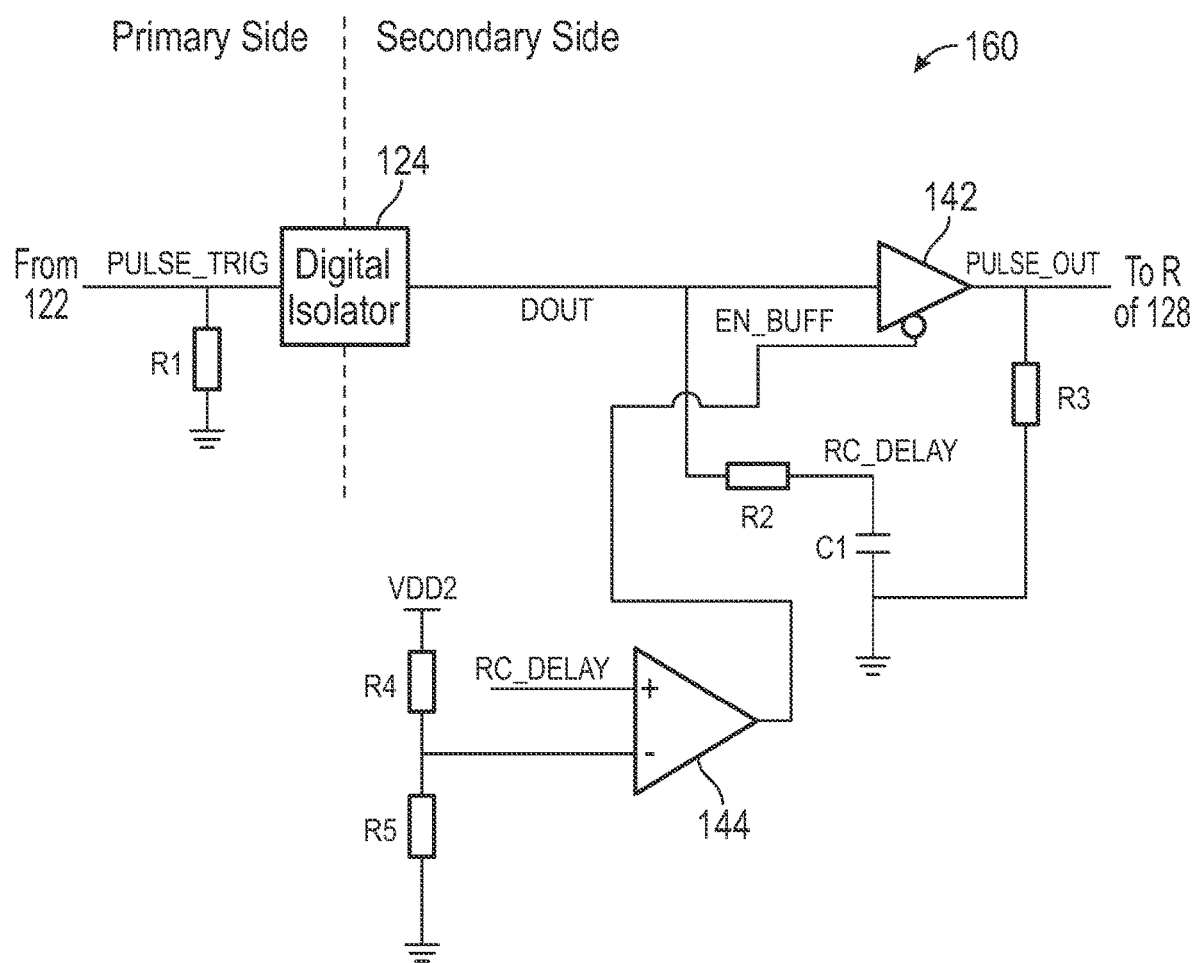
FIG. 3 is a schematic diagram of an example embodiment of edge triggered circuitry for providing a reset pulse to the latching relay of the field device of FIG. 1.

In one configuration, referring to FIG. 3, the present invention uses a single digital isolator channel with edge triggered reset circuitry 160, which, when triggered by a rising edge on PULSE_TRIG, will generate a specifically timed pulse across the isolation barrier 124 at PULSE_OUT which is applied to the reset input of relay 128 shown in FIG. 2. Digital isolator 124 provides the isolation barrier interface and is supplied power from the primary (loop powered) side and secondary (relay) side. During normal operation, the input PULSE_TRIG is pulled low by resistor R1 The output of the isolator 124 (DOUT) is provided to a tri-state buffer 142 with enable (EN_BUFF) which is initially low, and therefore output enabled, such that PULSE_OUT signal is initially low.

When a rising edge on PULSE_TRIG occurs, PULSE_OUT goes high, which begins the pulse output. DOUT is also connected to an RC circuit (R2 & C1), which then begins charging. When the RC value (RC_DELAY) exceeds the threshold set by R4 and R5, the output of comparator 144, EN_BUFF, goes high. This puts the output of the tri-state buffer 142 into a high impedance state. The pull-down resistor R3 then pulls the PULSE_OUT signal low which completes the pulse period of the output. R4 and R5 values are chosen, along with the R2 & C1 time constant, to achieve the desired pulse duration based on requirements of the specific latching relay by action of the comparator 144, This is one example configuration of pulse duration circuitry.

Figure 4:
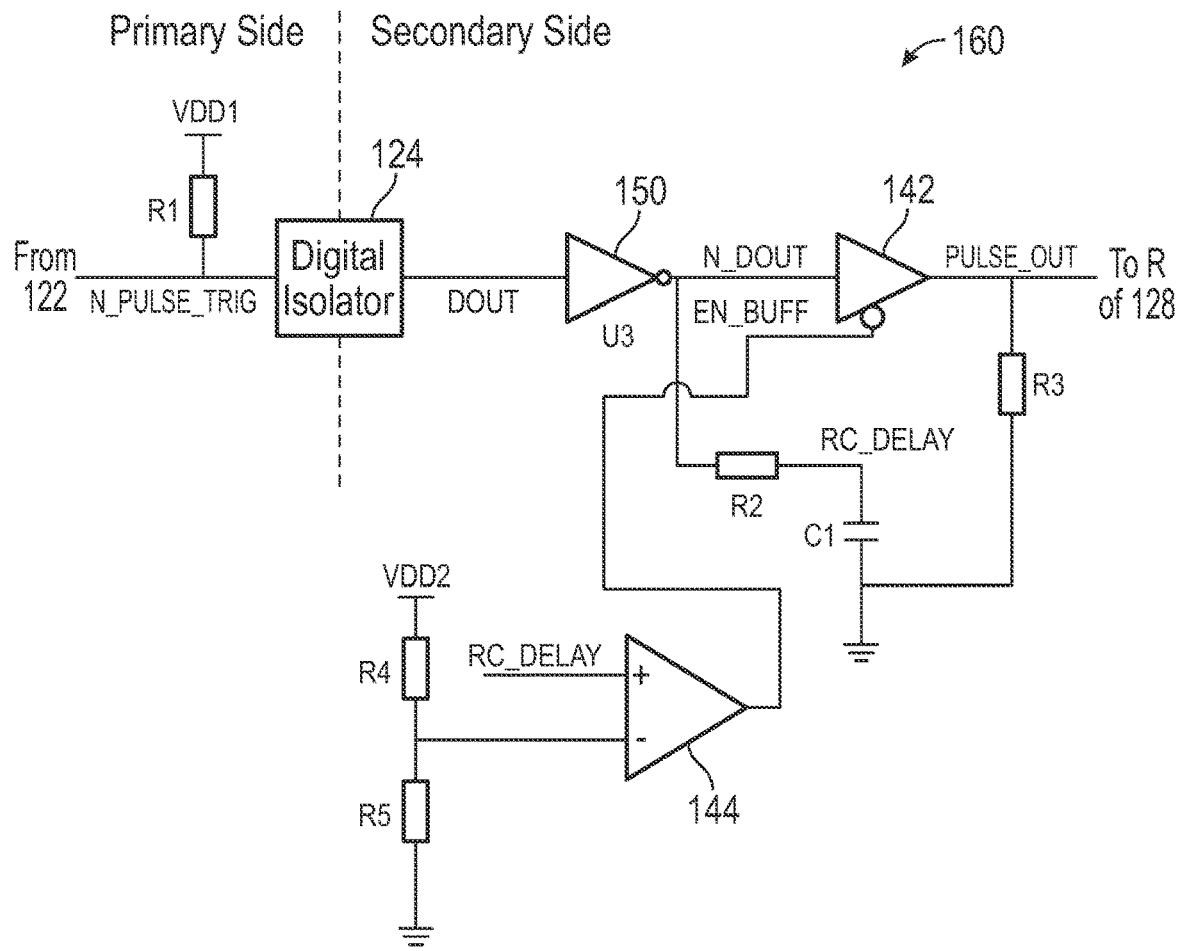
FIG. 4 is a schematic diagram of another example embodiment of edge triggered circuitry for providing a reset pulse to the latching relay of the field device of FIG. 1.

In another example configuration shown in FIG. 4, a high voltage switch relay terminal block is used and the PULSE_OUT signal used to reset the relay state is instead initiated by loss of primary side power (4/20 mA loop power). This is achieved by using the default output state of the digital isolator 124, which the device will drive to upon loss of primary side power. A default low isolator 124 is shown.

In the configuration of FIG. 4, the trigger signal now has a pullup implementation with resistor R1 and power supply VDD1, and an inverter 150 added to achieve the same pulse output as described above for FIG. 3, in conjunction with the default-low state of the isolator 124, When the output of isolator 124 goes to its default low state, inverter 150 will apply a high signal to the input of tri-state buffer 142.

Figure 5:
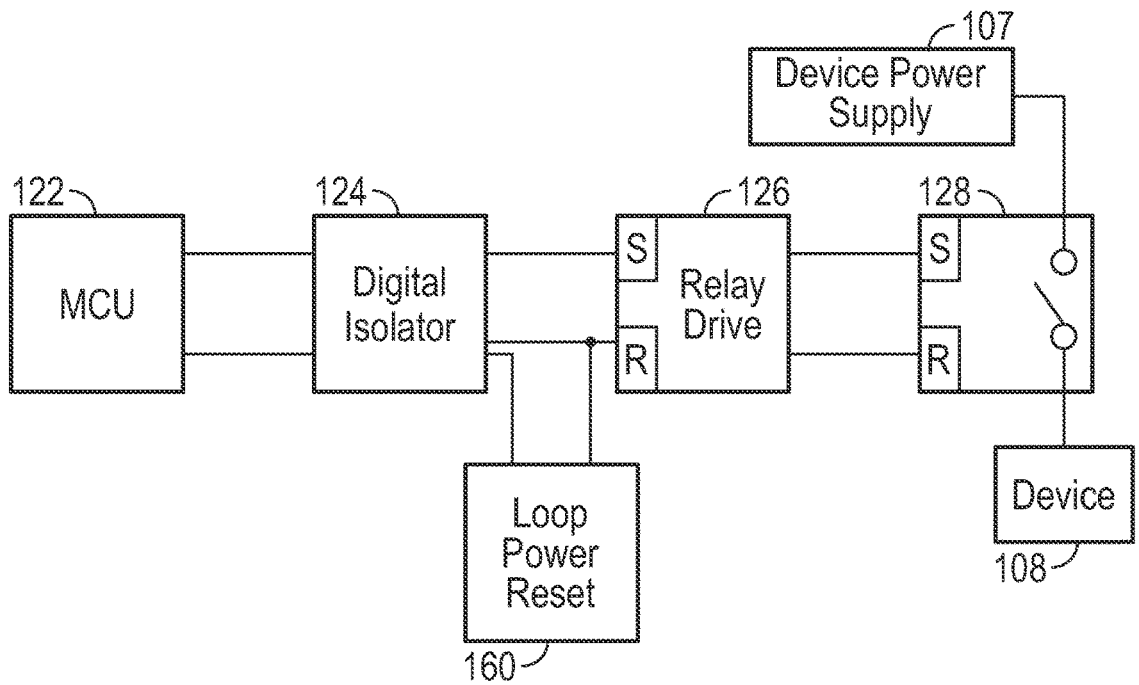
FIG. 5 is a simplified block diagram showing a loop power reset circuitry coupled to a relay drive circuit.

The configurations set forth herein eliminate problems associated with the latching relay 128 being in a state that the operator does not expect, and cannot control, if loop power is lost while still allowing the low power design to be implemented. The block diagram of FIG. 5 shows the MCU 122 and latching relay 128 with the addition of power reset circuitry 160.

Figure 6:
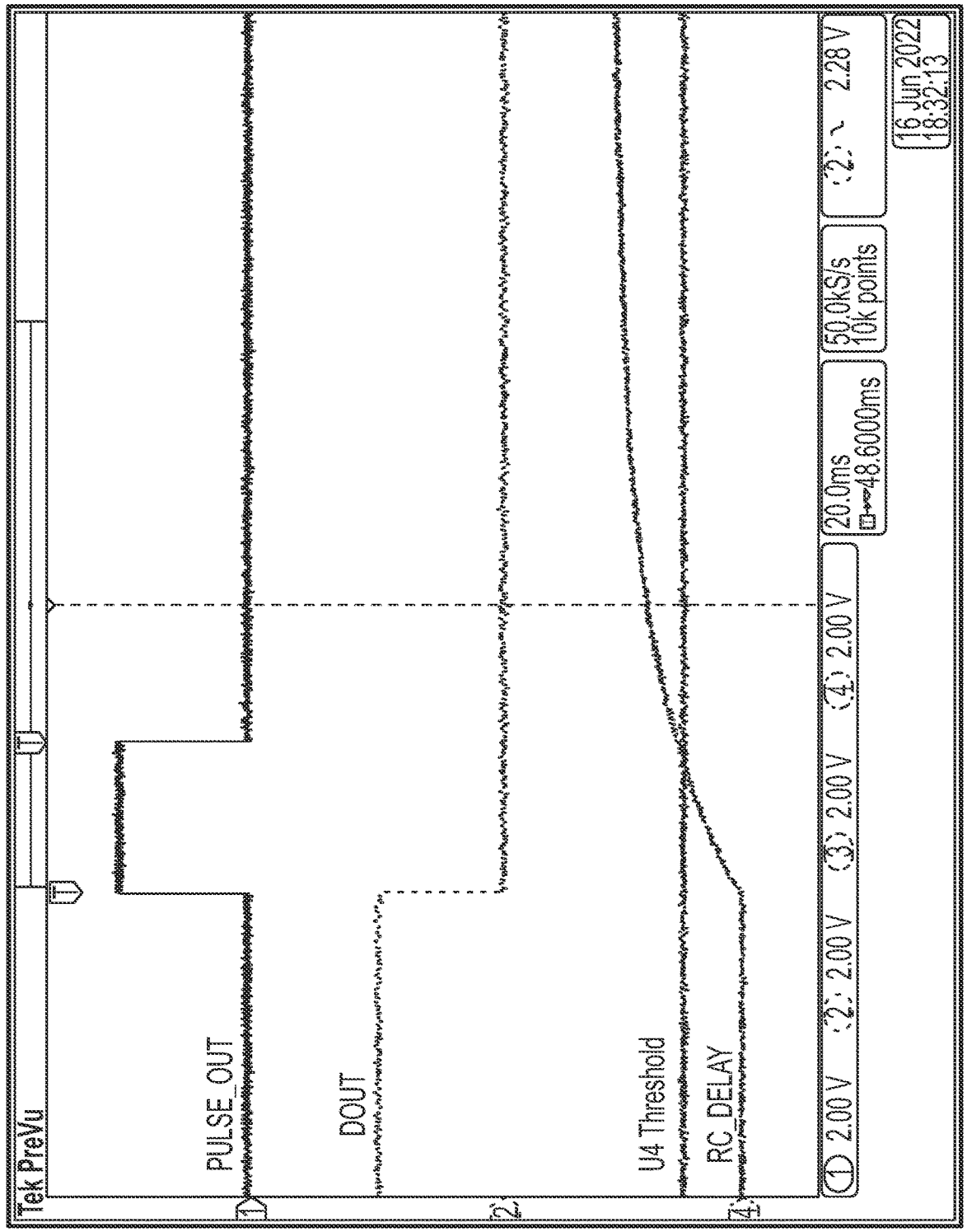
FIG. 6 is an example output of an oscilloscope output showing various signals in connection with the circuitry of FIG. 4.

FIG. 6 is an oscilloscope output showing operation of the present invention. In FIG. 6, the DOUT signal is initially pulled high and then transitions to low as a result of loop power loss. This drives the default-low output state of the isolator 124. This initiates the PULSE_OUT signal high after the inverter 150. The RC_DELAY signal is charged and, when it meets the threshold level of comparator 144, the PULSE_OUT signal will go low by way of the tri-state buffer 142, ending the pulse with duration of approximately 20 mS or a selected duration a specific application may require.

Although the embodiments of the present disclosure have been described with reference to preferred embodiments, workers skilled in the art will recognize that changes may be made in form and detail without departing from the spirit and scope of the present disclosure. In one configuration the digital isolator comprises an optocoupler.

What is claimed is:

1. A field device for an industrial process comprising:
    a digital isolator which electrically divides the field device into a primary side for low voltage electronics from a secondary side;
    a device power supply located in the secondary side configured to provide power to a process control device which monitors or controls a process variable of the industrial process;
    a latching relay located in the secondary side coupled to the process control device and the device power supply having a set input to responsively couple the device power supply to the process control device and a reset input which causes the latching relay to enter an electrically open state to thereby disconnect the device power supply from the process control device;
    a controller located in the primary side configured to generate a switch signal, wherein the digital isolator extends between the primary side and the secondary side and couples to the switch signal from the controller configured to provide a digital output on the secondary side in response to the switch signal; and
    edge triggered circuitry coupled to the digital output of the digital isolator configured to provide a pulse output to the reset input of the latching relay in response the digital output of the digital isolator.

2. The field device of claim 1, wherein the process control device is selected from the group consisting of an actuator, a valve, and a solenoid.

3. The field device of claim 1 including pulse duration circuitry configured to control a duration of the pulse output provided to the reset input of the latching relay.

4. The field device of claim 3 wherein the pulse duration circuitry includes an RC circuit which charges in response to the digital output from the digital isolator.

5. The field device of claim 3 wherein the pulse duration circuitry includes a comparator which compares a rising voltage level to a threshold.

6. The field device of claim 5 wherein the comparator responsively provides an output to a tri-state buffer causing the pulse output supplied to the reset input to go low.

7. The field device of claim 1 wherein the edge triggered circuitry includes a tri-state buffer which provides the pulse output to the reset input of the latching relay.

8. The field device of claim 7 wherein the pulse output is pulled low through a resistor connected to electrical ground.

9. The field device of claim 7 wherein the tri-state buffer is configured to enter a high impedance output state after providing the pulse output to the new set input of the latching relay.

10. The field device of claim 1 wherein the digital isolator has a default low output.

11. The field device of claim 10 including an inverter coupled to the default low output of the digital isolator.

12. The field device of claim 1 including communication circuitry coupled to a two-wire process control loop.

13. The field device of claim 12 wherein the communication circuitry receives power from the two-wire process control loop to provide power to the controller.

14. The field device of claim 13 wherein the pulse output to the reset input of the latching relay is provided upon loss of power from the two-wire process control loop.

15. The field device of claim 14 wherein the switch signal from the controller is pulled high through a resistor coupled to a power supply.

\* \* \* \* \*